(12) United States Patent
Agetsuma

(10) Patent No.: US 6,586,692 B2
(45) Date of Patent: Jul. 1, 2003

(54) VEHICLE-MOUNTING STEERING SWITCH

(75) Inventor: Nobuaki Agetsuma, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/997,636

(22) Filed: Nov. 29, 2001

(65) Prior Publication Data

US 2002/0066658 A1 Jun. 6, 2002

(30) Foreign Application Priority Data

Dec. 1, 2000 (JP) ............................ 2000-367162
Dec. 1, 2000 (JP) ............................ 2000-367168
Dec. 1, 2000 (JP) ............................ 2000-367172

(51) Int. Cl.$^7$ ............................................. H01H 9/00
(52) U.S. Cl. ........................................... 200/61.54
(58) Field of Search ................. 74/484 R; 200/61.27, 200/61.54–61.57

(56) References Cited

U.S. PATENT DOCUMENTS

| 5,335,743 A | * | 8/1994 | Gillbrand et al. | ........ | 200/61.54 |
| 5,365,803 A | * | 11/1994 | Kelley et al. | ............ | 200/61.57 |
| 5,403,981 A | * | 4/1995 | Chen et al. | ............... | 200/61.54 |
| 5,520,066 A |   | 5/1996 | Tueri | ......................... | 74/484 R |
| 5,756,950 A |   | 5/1998 | De Filippo | ............... | 200/61.54 |
| 5,855,144 A |   | 1/1999 | Parada | ......................... | 74/552 |
| 6,268,576 B1 | * | 7/2001 | Onodera | ................... | 200/61.54 |

* cited by examiner

Primary Examiner—Michael Friedhofer
(74) Attorney, Agent, or Firm—Brinks Hofer Gilson & Lione

(57) ABSTRACT

A vehicle-mounting steering switch includes a manipulating knob which is rotatably and pivotally supported on a support member. The support member is fixedly secured to a rear surface of a pad of the steering wheel and, the manipulating knob is protruded into the inside of a space defined between a ring and the pad. A circuit board which is provided with a pair of resistance patterns is mounted on the support member, while a sliding element which is slidable on the circuit board is mounted on the manipulating knob. When a driver performs push or pull manipulation of the manipulating knob with his finger, a relative position of the circuit board and the sliding element is changed so that two kinds of ON signals are outputted. In response to these ON signals, it becomes possible to shift transmission gears in the midst of cruising in a drive range.

15 Claims, 5 Drawing Sheets

VEHICLE-MOUNTING STEERING SWITCH

BACKGROUND OF THE INVENTION

1. Field of the Invention

The present invention relates to a vehicle-mounting steering switch which is attached to a steering wheel of an automobile and is served for manipulating various equipment such as an automatic transmission.

2. Description of the Prior Art

Conventionally, there has been known a technique in which a plurality of steering switches are mounted at an arbitrary position of a steering wheel and when a driver selectively manipulates these steering switches, the transmission gears are shifted up or down manually in the midst of travelling within a drive range, for example.

As a conventional example of such a vehicle-mounting steering switch, there has been proposed a vehicle-mounting steering switch in which a plurality of manipulating knobs are arranged at a front surface or both front and back surfaces of a pad extending toward the inside of a ring of the steering wheel and press switches are respectively housed in the inside of respective manipulating knobs. These press switches incorporate movable contacts and fixed contacts therein. When the manipulating knob is in the unpushed state, the movable contacts in the press switches are separated from the fixed contacts so that the press switch becomes the OFF state. On the other hand, when the push manipulation of an arbitrary manipulating knob is performed, the movable contact in the corresponding press switch is brought into contact with the fixed contact so that the press switch performs the ON operation.

In the vehicle-mounting steering switch having such a constitution, when the driver selectively performs the push manipulation of an arbitrary manipulating knob while gripping the ring of the steering wheel, the press switch housed in the inside of the manipulating knob performs the ON operation so that the transmission gears can be shifted up in response to an ON signal, for example, while when the driver performs the push manipulation of the separate manipulating knob, the separate press switch which is housed in the inside of the manipulating knob performs the ON operation so that the transmission gears can be shifted down in response to the ON signal.

As mentioned previously, the conventional vehicle-mounting steering switch is constituted such that a plurality of manipulating knobs are arranged at the arbitrary position of the steering wheel and by selectively performing the push manipulation of these manipulating knobs using a finger of the driver, the ON/OFF operations of the respective press switches housed in the inside of respective manipulating knobs are performed. Accordingly, when two different controls consisting of "shift-up" and "shift-down", for example, are performed in response to the ON/OFF changeover signals of respective press switches, it is necessary for the driver to perform the selective push manipulation of at least two manipulating knobs. Particularly, when the driver continuously performs the changeover of two controls, the driver has to largely move his finger from one manipulating knob to the other manipulating knob so that there still exists room for improvement in terms of the operability.

Further, as mentioned above, in the conventional vehicle-mounting steering switch, at least two manipulating knobs are necessary for performing two different controls and these manipulating knobs are arranged at a pad of the steering wheel. However, it is usually necessary to ensure a space for installing a horn switch, an airbag and the like in the pad of the steering wheel so that there arises a problem that the space for installing the manipulating knobs is largely restricted. Particularly, when the same control function is given to the left and right manipulating knobs to enhance the operability, it is necessary to arrange four manipulating knobs in total at the pad of the steering wheel, that is, two steering wheels at the left side and another two steering wheels at the right side of the pad. Such an arrangement which arranges a large number of manipulating knobs in the limited space of the steering wheel also gives rise to a problem that the degree of freedom of design is significantly restricted.

SUMMARY OF THE INVENTION

The present invention has been made in view of the circumstances of the prior art and it is an object of the present invention to provide a vehicle-mounting steering switch which exhibits excellent operability and also can minimize the space for installation.

To achieve the abovementioned objects, a vehicle-mounting steering switch according to the present invention includes a support member which is mounted on a steering wheel having spokes thereof extended in the inside of an annular ring thereof, a manipulating knob which is rotatably and pivotally supported on the support member, and output changeover means which is capable of outputting two different kinds of electric signals in response to a rotating direction of the manipulating knob, wherein the manipulating knob is protruded into a space defined between the spokes and the ring, and wherein the manipulating knob is rotatably manipulated in directions opposite to each other with respect to a rotationally neutral position of the manipulating knob, whereby the output changeover means selectively outputs one of the electric signals.

In the vehicle-mounting steering switch having such a constitution, when a driver pushes one manipulating knob which is protruded into the space defined between the spokes and the ring of the steering wheel toward the depth side or pulls such a manipulating knob in the front direction with his finger, two different kinds of electric signals are selectively outputted from the output changeover means in response to the rotating direction of the manipulating knob. Accordingly, two different controls can be performed with the push/pull manipulation of one manipulating knob so that the operability can be enhanced and the installation space can be reduced.

In the abovementioned constitution, it is preferable that the output changeover means is constituted of a first contact member which is mounted on the supporting member and a second contact member which is mounted on the manipulating knob and relative positions of these first and second contact members are changed in response to the rotating direction of the manipulating knob. By distributing the constituent members of the output changeover means to the support member and the manipulating knob in this manner, the vehicle-mounting steering switch can be miniaturized. In this case, a circuit board on which a conductive pattern such as a resistance pattern and a contact pattern is formed is preferably used as the first contact member and a sliding element which is brought into slide contact with the conductive pattern is preferably used as the second contact member. Due to such a constitution, two kinds of electric signals can be outputted from the circuit board which is mounted on the fixed-side supporting member so that the pulling-around of the signals is facilitated.

To achieve the abovementioned objects, a vehicle-mounting steering switch according to the present invention includes a support member which is mounted on a steering wheel having spokes thereof extended in the inside of an annular ring thereof, a manipulating knob which is rotatably and pivotally supported on the support member and is protruded into a space defined between the spokes and the ring, and a push element which is inserted between the support member and the manipulating knob and is brought into pressure contact with a cam face upon receiving a biasing force of a resilient member, and output changeover means which is capable of outputting two different kinds of electric signals in response to a rotating direction of the manipulating knob, wherein the manipulating knob is held at a rotationally neutral position when the push element is disposed at a valley of the cam face, and wherein when the manipulating knob is rotatably operated in directions opposite to each other with respect to a rotationally neutral position, the push element is shifted from the valley to a crest of the cam face against the biasing force of the resilient member whereby the output changeover means selectively outputs one of the electric signals.

In the vehicle-mounting steering switch having such a constitution, when a driver pushes one manipulating knob which is protruded into the space defined between the spokes and the ring of the steering wheel toward the depth side or pulls such a manipulating knob toward the front direction with his finger, two different kinds of electric signals are selectively outputted from the output changeover means in response to the rotational direction of the manipulating knob. Then, when the abovementioned pushing force or pulling force applied to the manipulating knob is removed, the push element is shifted from the crest to the valley of the cam face upon receiving the biasing force of the resilient member so that the manipulating knob is held at the rotationally neutral position in a stable manner. Accordingly, the driver can perform two different controls by performing with his finger the push/pull manipulation of one manipulating knob which is held at the rotationally neutral position. Furthermore, by releasing fingers from the manipulating knob, the manipulating knob automatically returns to the rotationally neutral position so that the operability is enhanced and, at the same time, the space for installing the manipulating knob can be reduced.

In the abovementioned constitution, it is preferable that the cam face is formed on the support member and the push element and the resilient member are held by the manipulating knob. In this case, by accommodating the push element and the resilient member in a holder and by inserting and fixedly securing a portion of the holder in a recess formed in the manipulating knob, the push element, the resilient member and the holder can be simply assembled into the manipulating knob so that the operability of assembling is enhanced.

Still further, to achieve the abovementioned object, the vehicle-mounting steering switch according to the present invention includes a support member which is mounted on a steering wheel having spokes thereof extended in the inside of an annular ring thereof, a manipulating knob which is rotatably and pivotally supported on the support member and is protruded into a space defined between the spokes and the ring, a hollow which is formed on either one of the support member and the manipulating knob, a stopper protrusion which is formed on the other of the support member and the manipulating knob and is protruded into the inside of the hollow, and output changeover means which is capable of outputting two different kinds of electric signals in response to a rotating direction of the manipulating knob, wherein by rotatably operating the manipulating knob in directions opposite to each other with respect to a rotationally neutral position, the output changeover means selectively outputs one of the electric signals, and wherein the stopper protrusion is brought into contact with an inner wall of the hollow so that a rotational range of the manipulating knob is restricted.

In the vehicle-mounting steering switch having such a constitution, when a driver pushes one manipulating knob which is protruded into the space defined between the spokes and the ring of the steering wheel toward the depth side or pulls such a manipulating knob toward the front direction with his finger, two different kinds of electric signals are selectively outputted from the output changeover means in response to the rotational direction of the manipulating knob. Then, at a point of time that the stopper protrusion is brought into contact with the inner wall of the hollow, the further rotation of the manipulating knob is restricted. Accordingly, the driver can perform two different controls by performing the push/pull manipulation of one manipulating knob with his finger. Furthermore, even when an excessive force is applied to the manipulating knob during such a manipulation, the force is received by the stopper protrusion in a stable manner and hence, the operability can be enhanced and the space for installing the manipulating knob can be reduced.

In the abovementioned constitution, it is preferable that the stopper protrusion is mounted on a fixed-side support member and the hollow is formed on the movable-side manipulating knob. Due to such a constitution, by making effective use of the inner space of the manipulating knob, a stopper mechanism having a compact shape and high strength can be realized. In this case, by increasing a thickness of the inner wall of the hollow at a position with which the stopper protrusion is brought into contact compared to other peripheral portions, the strength of the stopper can be further enhanced.

Further, in the abovementioned constitution, although the shape of the stopper protrusion is not limited, with the use of the stopper protrusion which has a tapered shape narrowed toward a distal end thereof, the rotational angle of the stopper protrusion can be freely determined corresponding to a taper angle of the stopper protrusion.

PREFERRED EMBODIMENTS OF THE PRESENT INVENTION

Figure 1:
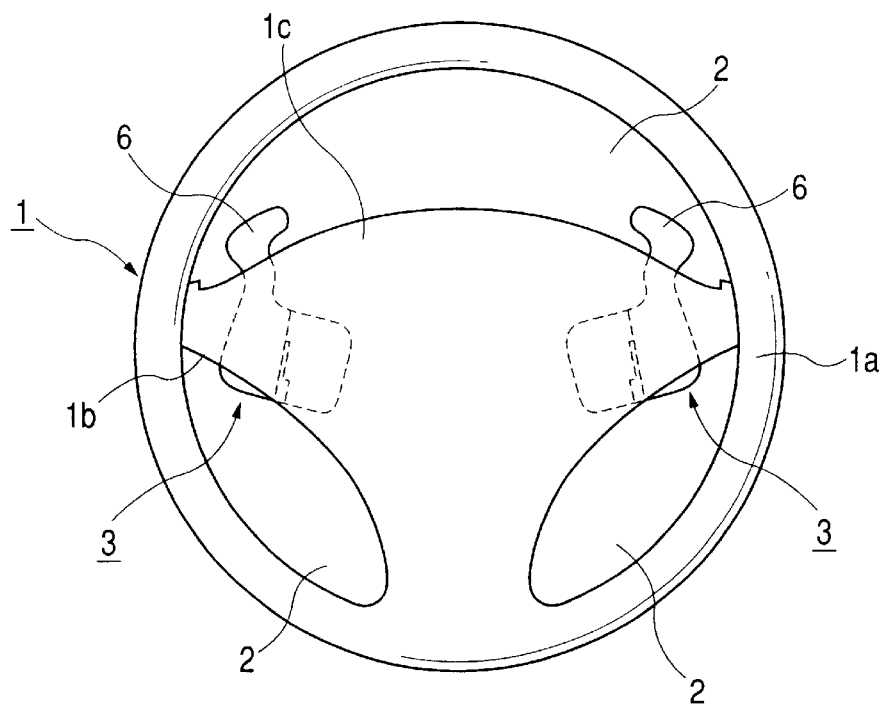
FIG. 1 is a front view of a steering wheel to which a vehicle-mounting steering switch according to an embodiment of the present invention is attached.
Figure 2:
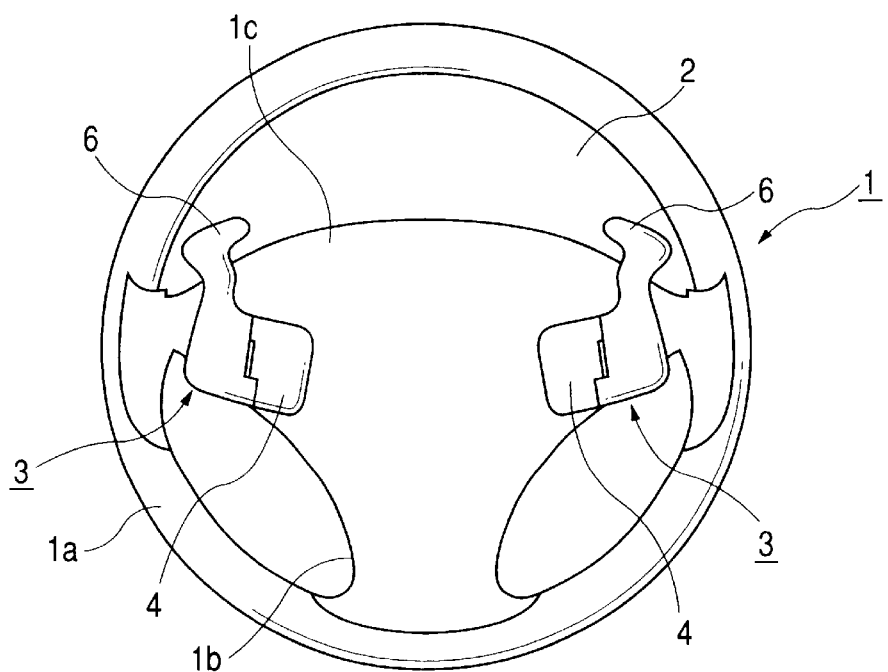
FIG. 2 is a rear view of the steering wheel.
Figure 3:
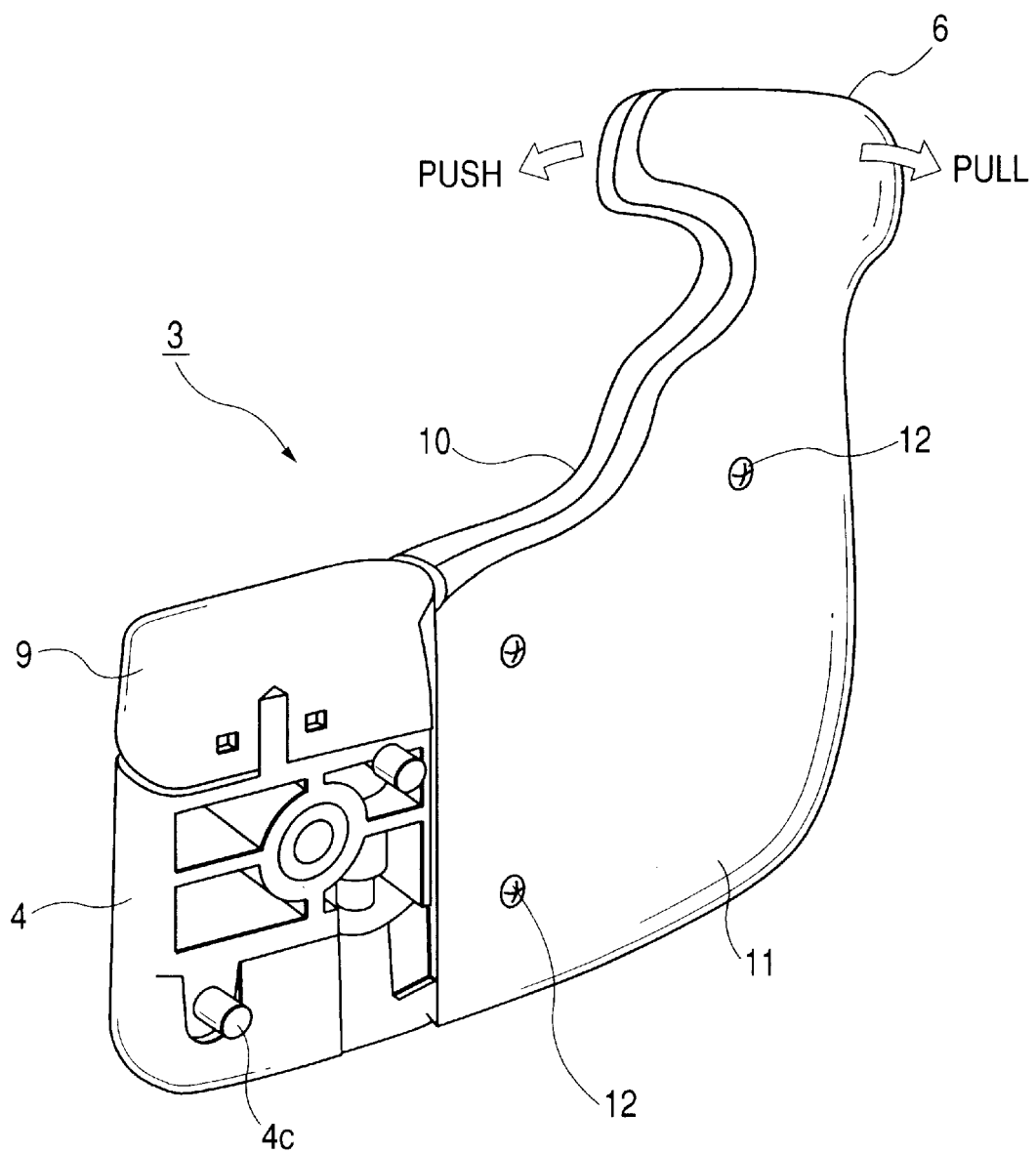
FIG. 3 is a perspective view of the vehicle-mounting steering switch.
Figure 4:
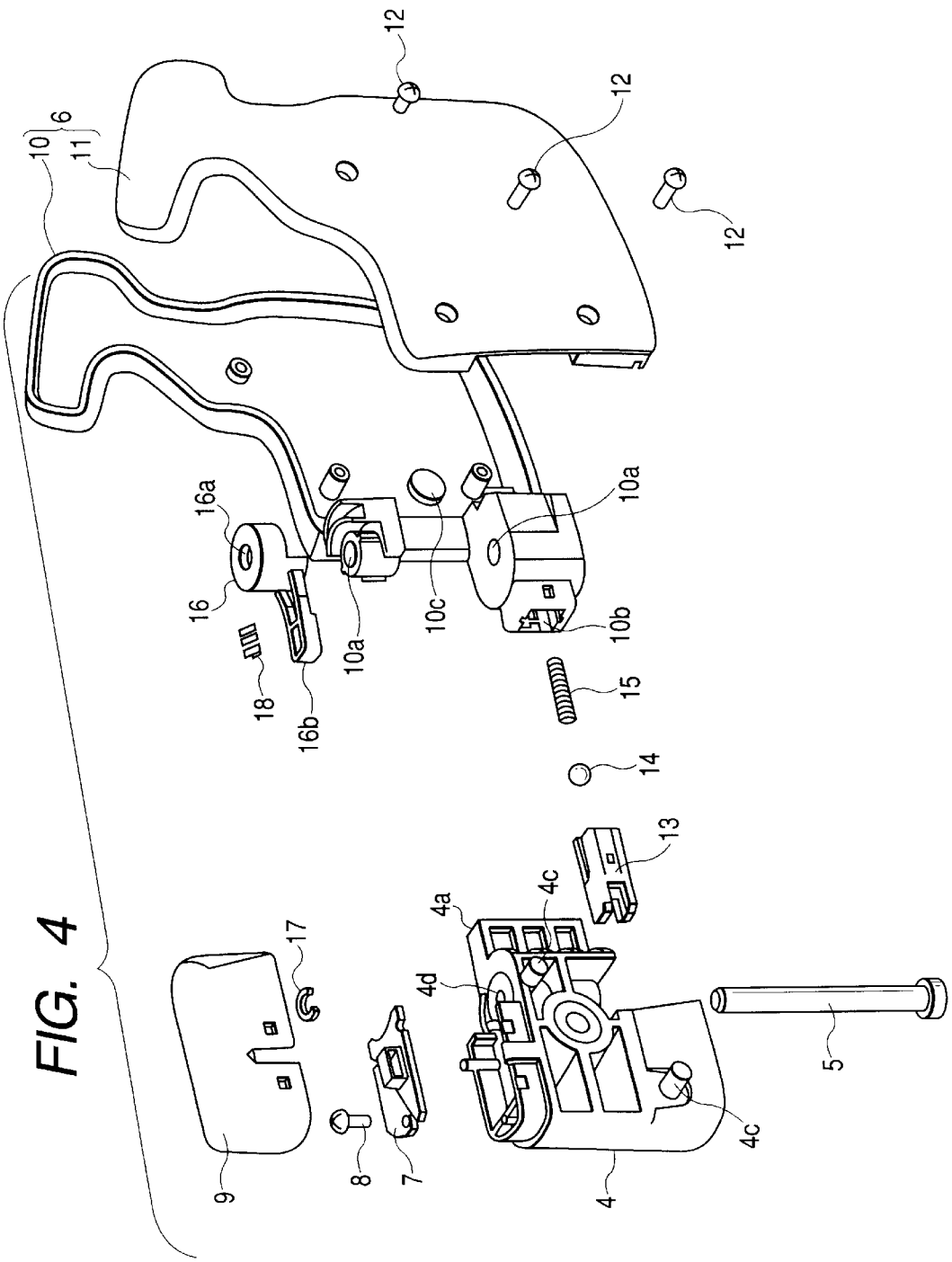
FIG. 4 is an exploded perspective view of the vehicle-mounting steering switch.

To explain embodiments of the present invention in conjunction with attached drawings, FIG. 1 is a front view of a steering wheel to which a vehicle-mounting steering switch according to an embodiment of the present invention is attached, FIG. 2 is a rear view of the steering wheel, FIG. 3 is a perspective view of the vehicle-mounting steering switch, FIG. 4 is an exploded perspective view of the vehicle-mounting steering switch, FIG. 5 is an explanatory view showing a self return mechanism of the vehicle-mounting steering switch, and FIG. 6 is an explanatory view showing a stopper mechanism of the vehicle-mounting steering switch and the changeover operation of contacts.

As shown in FIG. 1 and FIG. 2, a steering wheel 1 is substantially constituted of an annular ring 1a thereof, spokes 1b which are extended from an inner side of the ring 1a toward the center of the ring 1a and a pad 1c which substantially covers the whole of the spokes 1b. A plurality of (for example, three) spaces 2 are defined between the inner periphery of the ring 1a and the pad 1c. On the rear surface of the pad 1c, two vehicle-mounting steering switches 3 are mounted such that one switch 3 is arranged at the left side and the other switch 3 is arranged at the right side. A portion of each vehicle-mounting steering switch 3 is protruded into the inside of one space 2 from the rear surface of the pad 1c. In this embodiment, although the vehicle-mounting steering switches 3 are mounted on the rear surface of the pad 1c such that one switch is arranged at the left side and the other is arranged at the right side, the vehicle-mounting steering switches 3 are different only in shape derived from the left-and-right symmetrical arrangement and substantially have the same structure and the same manner of operation. Accordingly, the explanation is made hereinafter with respect to the vehicle-mounting steering switches 3 which is shown at the right side of FIG. 1.

As shown in FIG. 3 to FIG. 6, the vehicle-mounting steering switch 3 includes a fixed-side support member 4 and a movable-side manipulating knob 6 and the manipulating knob 6 is rotatably and pivotally supported on the support member 4 by means of a connecting pin 5. As will be explained later, a driver can perform the push or pull manipulation of the manipulating knob 6 using his finger and the changeover of two controls consisting of "shift-up" and "shift-down" can be performed in response to two kinds of ON signals outputted by such a push/pull manipulation.

The support member 4 made of synthetic resin includes a plurality of positioning protrusions 4c. In the state that the rotation of the support member 4 is stopped with these protrusions 4c, the support member 4 is fixedly secured to a rear surface of the pad 1c using suitable means such as screws. Further, the support member 4 is provided with a shaft hole 4d through which the connecting pin 5 passes. A stopper protrusion 4a is integrally formed on one side surface of the support member 4. The stopper protrusion 4a is formed in a normal tapered shape whose thickness is gradually decreased from a proximal end thereof to a distal end thereof (see FIG. 6). Further, as shown in FIG. 5, a cam face 4b is formed on a side surface of a lower portion of the support member 4 and this cam face 4b has an approximately V-shaped cross section. Further, a circuit board 7 is fixedly secured to an upper surface of the support member 4 by means of a screw 8. The circuit board 7 is covered with a cover 9 made of synthetic resin which is connected to the upper portion of the support member 4 by a snap fitting. As shown in FIG. 6, a pair of resistance patterns 7a, 7b and one collector pattern 7c are formed on the circuit board 7 and these resistance patterns 7a, 7b and collector pattern 7c are extended to the outside of the support member 4 by way of a pull-around pattern, a cable or the like not shown in the drawing.

The manipulating knob 6 is constituted of a knob body 10 made of synthetic resin and a knob cover 11. These knob body 10 and the knob cover 11 are bonded to each other and are integrally formed using a plurality of screws 12. As mentioned previously, the manipulating knob 6 is rotatably and pivotally supported on the support member 4 by means of the connecting pin 5 and has a free-end side thereof protruded into the inside of the space 2 from the rear surface of the pad 1c. A shaft hole 10a which allows the connecting pin 5 to pass therethrough is formed in the knob body 10. A recess 10b which is extended in the direction perpendicular to an axis of the shaft hole 10a is formed in a lower portion of the knob body 10. A portion of a holder 13 is inserted into and is fixedly secured to the recess 10b and a ball 14 and a spring 15 are accommodated in the holder 13. As shown in FIG. 5, the ball 14 is brought into pressure contact with the cam face 4b of the support member 4 upon receiving the resilient repulsive force of the spring 15. When the manipulating knob 6 is rotated about the connecting pin 5, the ball 14 is designed to be moved or shifted from a valley to a crest of the cam face 4b while compressing the spring 15. Further, a rotary slider 16 is mounted on an upper portion of the knob body 10 by a concave/convex fitting and a shaft hole 16a which allows the connecting pin 5 to pass therethrough is also formed in the rotary slider 16. The connecting pin 5 passes through the respective shaft holes 10a, 16b which are formed in the knob body 10 and the rotary slider 16 and the shaft hole 4d which is formed in the support member 4. A washer 17 is engaged with an upper end of the connecting pin 5 to prevent the removal of the connecting pin 5. A protrusion 16b which is extended in parallel with an upper surface of the support member 4 is formed on the rotary slider 16. A sliding element 18 is mounted on a lower surface of the protrusion 16b. The rotary slider 16 is rotated above the circuit board 7 in an interlocking manner with the rotation of the manipulating knob 6. Along with the rotation of the rotary slider 16, the sliding element 18 is slidably moved on the resistance patterns 7a, 7b and the collector pattern 7c formed on the circuit board 7. The circuit board 7 and the sliding element 18 constitute output changeover means.

As shown in FIG. 6, a hollow 19 which has one side face thereof opened is formed in the inside of the manipulating knob 6. The hollow 19 is defined by bonding and integrally forming the knob body 10 and the knob cover 11. The stopper protrusion 4a of the support member 4 is inserted into the inside of the hollow 19. Given gaps are ensured between inner walls of the hollow 19 and the stopper protrusion 4a along the rotating direction of the manipulating knob 6. Here, thick walls 10c, 11a are respectively formed on the inner walls of the knob body 10 and the knob cover 11. Along with the rotation of the manipulating knob 6, the stopper protrusion 4a is brought into contact with the thick walls 10c, 11a so that the rotational angle of the manipulating knob 6 is restricted within a given range.

Then, the manner of operation of the vehicle-mounting steering switch 3 having such a constitution is explained mainly in conjunction with FIG. 5 and FIG. 6.

Figure 5A:
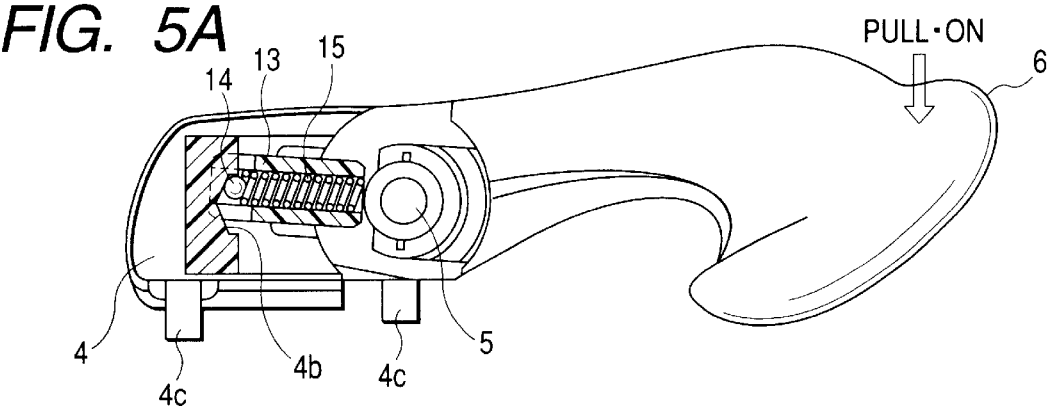
FIG. 5 is an explanatory view showing a self return mechanism of the vehicle-mounting steering switch.
Figure 5B:
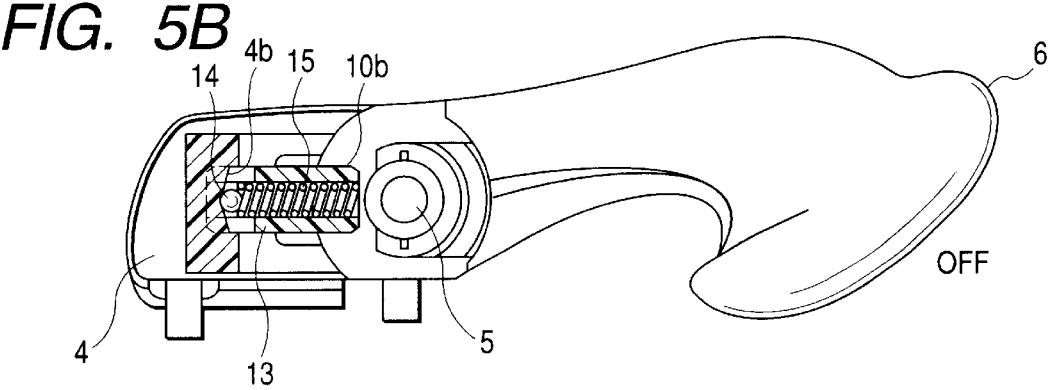
Figure 6A:
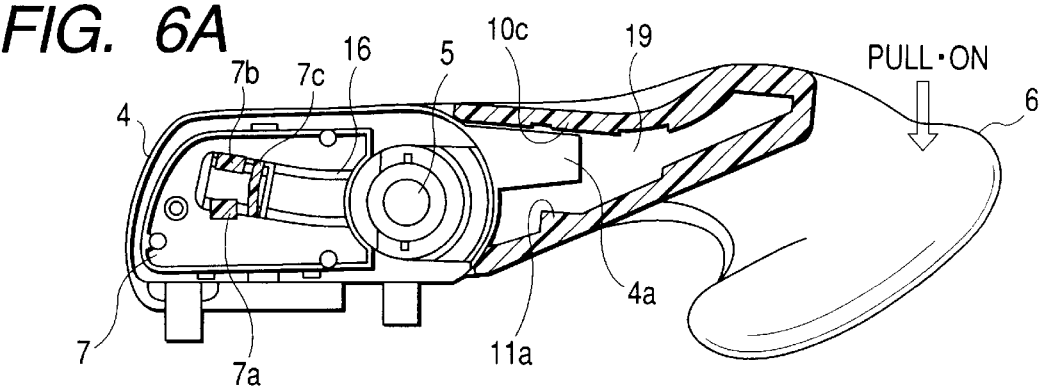
FIG. 6 is an explanatory view showing a stopper mechanism of the vehicle-mounting steering switch and the changeover operation of contacts.
Figure 6B:
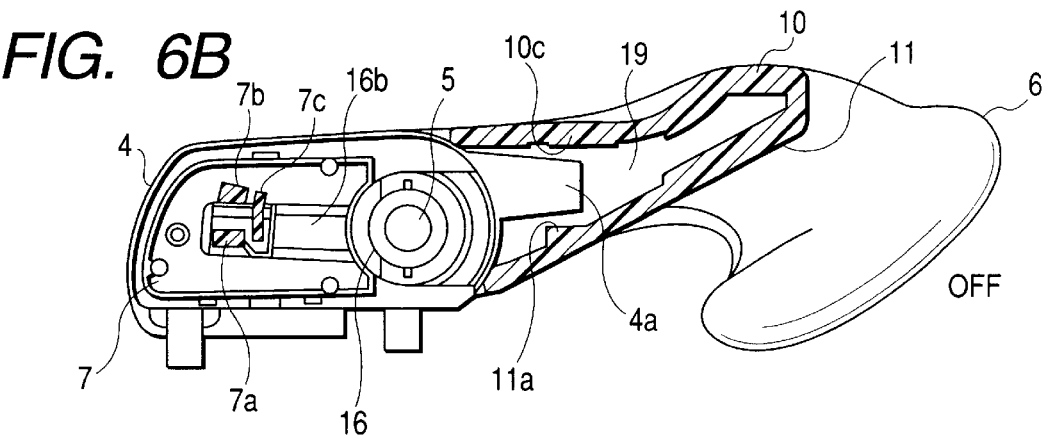

As mentioned previously, respective manipulating knobs 6 of a pair of left and right vehicle-mounting steering switches 3 are protruded into the inside of the spaces 2 from the rear surface of the pad 1c of the steering wheel 1. As shown in FIG. 5B, in the non-manipulating state in which no external force acts on these manipulating knobs 6, the balls 14 are brought into pressure contact with the valleys of the cam faces 4b upon receiving the resilient repulsive force of the springs 15 so that both manipulating knobs 6 are held at the rotationally neutral position in a stable manner. Here, as shown in FIG. 6B, the stopper protrusions 4a face the thick walls 10c, 11a in the inside of the hollows 19 with a given distance therebetween. Further, the sliding elements 18 which are mounted on the rotary slider 16 are arranged separately from both resistance patterns 7a, 7b on the circuit board 7 so that both vehicle-mounting steering switches 3 are in the switch-off state.

Figure 5C:
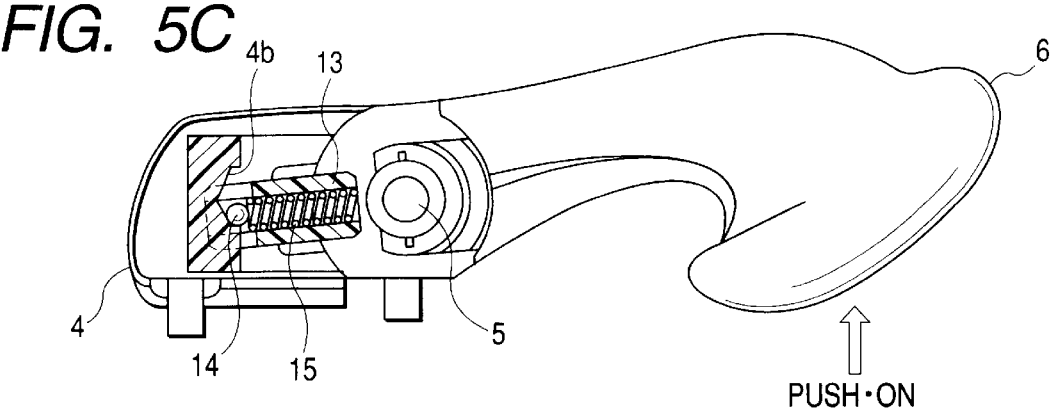
Figure 6C:
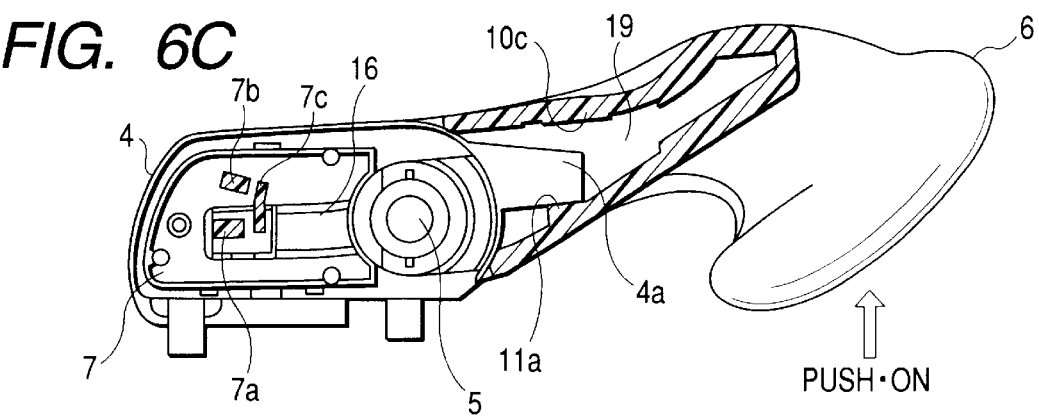

In such a switch-off state, when a driver who grips the ring 1a of the steering wheel pushes one of the left and right manipulating knobs 6, for example, the right-side manipulating knob 6 toward the depth side with his thumb, as shown in FIG. 5C, the manipulating knob 6 is rotated in one direction about the connecting pin 5. Along with such a rotation, the ball 14 is shifted from the valley to the one-side crest of the cam face 4b while compressing the spring 15. Then, as shown in FIG. 6C, one thick wall 11a disposed in the inside of the hollow 19 is brought into contact with the stopper protrusion 4a so that the manipulating knob 6 is subjected to the angular restriction such that the further rotation of the manipulating knob 6 is prevented. At this point of time, the sliding element 18 comes into contact with one resistance pattern 7a so that the resistance pattern 7a and the collective pattern 7c are electrically connected with each other through the sliding element 18 so that the switch-on state is established thus outputting a first ON signal. Accordingly, in response to this first ON signal, the driver can manually perform the shift-up of the transmission gears in the midst of cruising in a drive range. Here, when the push manipulating force applied to the manipulating knob 6 is removed, the ball 14 is shifted from the crest to the valley of the cam face 4b due to the resilient repulsive force of the spring 15 so that the manipulating knob 6 automatically returns to the rotationally neutral position. Corresponding to such automatic return of the manipulating knob 6, the switch-OFF state is established so that the transmission gear return to the drive range.

Further, when the driver pulls the right-side manipulating knob 6 in the switch-off state toward the front direction with his forefinger or his middle finger, for example, as shown in FIG. 5A, the manipulating knob 6 is rotated in the other direction about the connecting pin 5. Along with such a rotation, the ball 14 is shifted from the valley to the other crest of the cam face 4b while compressing the spring 15. Then, as shown in FIG. 6A, the other thick wall 10c in the inside of the hollow 19 is brought into contact with the stopper protrusion 4a so that the manipulating knob 6 is subjected to the angular restriction such that the further rotation of the manipulating knob 6 is prevented. At this point of time, the sliding element 18 comes into contact with the other resistance pattern 7b so that the resistance pattern 7b and the collective pattern 7c are electrically connected through the sliding element 18 so that the switch-on state is established thus outputting a second ON signal. Accordingly, in response to this second ON signal, the driver can manually perform the shift-down of the transmission gears in the midst of cruising in a drive range. Also in this case, when the pull manipulating force applied to the manipulating knob 6 is removed, the ball 14 is shifted from the crest to the valley of the cam face 4b upon receiving the resilient repulsive force of the spring 15 so that the manipulating knob 6 automatically returns to the rotationally neutral position. Corresponding to such an automatic return of the manipulating knob 6, the switch-OFF state is established so that the transmission gears returns to the drive range.

The operation of the left-side manipulating knob 6 is substantially equal to the operation of the right-side manipulating knob 6. Accordingly, the driver can perform the shift-up or the shift-down of the transmission gears by selectively performing the push/pull manipulation of either one of left and right manipulating knobs 6.

As mentioned above, in the vehicle-mounting steering switch 3 according to this embodiment, two controls consisting of the shift-up and the shift-down of the transmission gears can be selectively performed by protruding the manipulating knob 6 which is rotatably and pivotally mounted on the support member 4 into the inside of the space 2 of the steering wheel 1 and by performing the push/pull manipulation of the manipulating knob 6 with the driver's finger. Accordingly, the operability can be extremely enhanced. Further, since two controls can be performed with one manipulating knob 6, the installation space for the manipulating knob 6 can be reduced. Further, the output changeover means is constituted of the circuit board 7 which is mounted on the support member 4 and the sliding element 18 which is mounted on the manipulating knob 6. With the use of such output changeover means, two different kinds of electric signals can be selectively outputted by changing the relative position of the circuit board 7 and the sliding element 18 corresponding to the rotational direction of the manipulating knob 6. Accordingly, the overall constitution of the output changeover means can be miniaturized and simplified so that the vehicle-mounting steering switch can be also miniaturized by distributing the constituent members of the output changeover means to the support member and the manipulating knob.

Further, the ball 14 held at the manipulating knob 6 side is resiliently biased against the cam face 4b of the support member 4 and the manipulating knob 6 is held at the rotationally neutral position when the ball 14 is brought into pressure contact with the valley of the cam face 4b. Due to such a constitution, it becomes possible to automatically return (self-return) the manipulating knob 6 to the rotationally neutral position by removing the push/pull manipulating force applied to the manipulating knob 6 so that the operability can be enhanced from this aspect. Furthermore, since the ball 14 and the spring 15 are housed in the holder 13 and a portion of the holder 13 is inserted into and fixedly secured to the inside of the recess 10b of the manipulating knob 6, the ball 14, the spring 15 and the holder 13 can be simply incorporated into the manipulating knob 6.

Further, the stopper protrusion 4a formed on the support member 4 is inserted into the inside of the hollow 19 of the manipulating knob 6 and the stopper protrusion 4a is brought into contact with the inner wall of the hollow 19 along with the rotation of the manipulating knob 6. Accordingly, even when an excessive force is applied to the manipulating knob 6 during the push or pull manipulation, the force can be received by the stopper protrusion 4a so that the manipulating knob 6 can ensure the stable strength. Furthermore, the thick walls 10c, 11a are formed on the inner wall of the hollow 19 and the stopper protrusion 4a is brought into contact with these thick walls 10c, 11a. Accordingly, it becomes possible to realize the stopper mechanism having high strength. Further, since the stopper protrusion 4a is formed in a tapered shape which is narrowed toward a distal end thereof, the rotational angle of the manipulating knob 6 can be freely determined by suitably adjusting a taper angle of the stopper protrusion 4a.

In the abovementioned embodiment, a case in which the changeover of the shift-up and the shift-down of the transmission gears is controlled by using the vehicle-mounting steering switch 3 has been explained. However, the content of the control which can be performed by the vehicle-mounting steering switch 3 is not limited to such controls and is applicable to other changeover of controls such as the changeover of the setting of the auto cruising and the changeover of muting of acoustic appliances.

Further, in the above embodiment, two vehicle-mounting steering switches 3 having the same function are respectively arranged at the left and right sides of the pad 1c of the steering wheel 1 and the driver can selectively perform the push/pull manipulation using the manipulating knobs 6 of both vehicle-mounting steering switches 3. However, one of these vehicle-mounting steering switches 3 may be omitted or the different changeovers of controls may be performed with respect to the left and right vehicle mounting steering switches.

Further, in this embodiment, a case in which the output changeover means is constituted of the circuit board 7 mounted on the support member 4 and the sliding element 18 mounted on the manipulating knob 6 has been explained. However, as long as the output changeover means can output two different kinds of electric signals in response to the rotational direction of the manipulating knob 6, any output changeover means can be used. For example, two press switches mounted on the support member 4 may be selectively subjected to the ON operation in response to the rotation of the manipulating knob 6.

Further, in this embodiment, a case in which the ball 14 which acts as a pressing element is brought into pressure contact with the cam face 4b of the support member 4 due to the resilient repulsive force of the spring 15 has been explained. However, it is possible to adopt a constitution in which a cylindrical body having a semispherical protrusion at a distal end thereof is used as the pressing element, a spring is accommodated in the pressing element and the pressing element is slidably held by the manipulating knob 6, for example.

Further, in this embodiment, the stopper protrusion 4a formed on the support member 4 is inserted into the inside of the hollow 19 formed in the manipulating knob 6. However, as an opposite case, a stopper protrusion formed on the manipulating knob 6 may be inserted into the inside of a hollow formed in the support member 4.

The present invention is carried out in the manner explained in the abovementioned embodiments and can achieve following advantageous effects.

When the manipulating knob which is protruded into the space defined between the spoke and the ring of the steering wheel is rotatably manipulated in one of opposite directions with respect to the rotationally neutral position, two different kinds of electric signals are selectively outputted in response to the rotational direction of the manipulating knob. Accordingly, the driver can perform two different controls by performing the push/pull manipulation of one manipulating knob so that it becomes possible to provide the vehicle-mounting steering switch which exhibits excellent operability and requires just a small installation space.

Further, when the driver performs the push or pull manipulation of the manipulating knob which is protruded into the inside of the space defined between the spoke and the ring of the steering wheel, two different kinds of electric signals are selectively outputted in response to the rotational direction of the manipulating knob. At the same time, the pressing element is shifted from the valley to the crest of the cam face upon receiving the biasing force of the resilient member. Accordingly, the driver can perform two different controls by performing with his finger the push/pull manipulation of one manipulating knob which is held at the rotationally neutral position. Furthermore, the driver can make the manipulating knob automatically return to the rotationally neutral position by removing such a push/pull manipulating force, whereby it becomes possible to provide the vehicle-mounting steering switch which exhibits excellent operability and requires just a small installation space.

Further, when the manipulating knob which is protruded into the space defined between the spoke and the ring of the steering wheel is rotatably manipulated in directions opposite to each other with respect to the rotationally neutral position, two different kinds of electric signals are selectively outputted in response to the rotational direction of the manipulating knob and, at the same time, the rotational angle of the manipulating knob is restricted since the stopper protrusion is brought into contact with the inner wall of the hollow. Accordingly, the driver can perform two different controls by performing the push/pull manipulation of one manipulating knob and even when the excessive force is applied to the manipulating knob during the manipulation, the manipulating knob can hold the stable strength due to the stopper protrusion, whereby it becomes possible to provide the vehicle-mounting steering switch which exhibits excellent operability and requires just a small installation space.

What is claimed is:

1. A vehicle-mounting steering switch comprising:

a support member which is mounted on a steering wheel having spokes thereof extended in an inside of an annular ring thereof, a manipulating knob which is rotatably and pivotally supported on the support member, and an output changeover mechanism which is configured to output two different kinds of electric signals in response to a rotating direction of the manipulating knob, wherein the manipulating knob is protruded into a space defined between the spokes and the ring, and wherein the manipulating knob is rotatably manipulated in directions opposite to each other with respect to a rotationally neutral position of the manipulating knob, whereby the output changeover mechanism selectively outputs one of the electric signals; and wherein the output changeover mechanism comprises a first contact member which is mounted on the supporting member and a second contact member which is mounted on the manipulating knob, and wherein two different kinds of electric signals are selectively outputted by changing relative positions of the first and second contact members.

2. A vehicle-mounting steering switch according to claim 1, wherein the first contact member comprises a circuit board on which a conductive pattern is formed, and wherein the second contact member comprises a sliding element which is brought into slide contact with the conductive pattern.

3. A vehicle-mounting steering switch according to claim 2, wherein the conductive pattern of the first contact member includes two resistance patterns and a collective pattern.

4. A vehicle-mounting steering switch comprising:

a support member which is mounted on a steering wheel having spokes thereof extended in an inside of an annular ring thereof, a manipulating knob which is rotatably and pivotally supported on the support member and is protruded into a space defined between the spokes and the ring, a push element which is inserted between the support member and the manipulating knob and is brought into pressure contact with a cam face upon receiving a biasing force of a resilient member, and an output changeover mechanism which is configured to output two different kinds of electric signals in response to a rotating direction of the manipulating knob, wherein the manipulating knob is held at a rotationally neutral position when the push element is disposed at a valley of the cam face, and wherein when the manipulating knob is rotatably operated in directions opposite to each other with respect to the rotationally neutral position, the push element is shifted from the valley to a crest of the cam face against the biasing force of the resilient member whereby the output changeover mechanism selectively outputs one of the electric signals.

5. A vehicle-mounting steering switch according to claim 4, wherein the cam face is formed on the support member, and the push element and the resilient member are held by the manipulating knob.

6. A vehicle-mounting steering switch according to claim 5, wherein the steering switch includes a holder which accommodates the push element and the resilient member, and wherein a portion of the holder is inserted into and is fixedly secured to a recess formed in the manipulating knob.

7. A vehicle-mounting steering switch according to claim 4, wherein the output changeover mechanism comprises a first contact member which is mounted on the supporting member and a second contact member which is mounted on the manipulating knob, and wherein two different kinds of electric signals are selectively outputted by changing relative positions of the first and second contact members.

8. A vehicle-mounting steering switch according to claim 7, wherein the first contact member comprises a circuit board on which a conductive pattern is formed, and wherein the second contact member comprises a sliding element which is brought into slide contact with the conductive pattern.

9. A vehicle-mounting steering switch according to claim 8, wherein the conductive pattern of the first contact member includes two resistance patterns and a collective pattern.

10. A vehicle-mounting steering switch comprising:

a support member which is mounted on a steering wheel having spokes thereof extended in an inside of an annular ring thereof, a manipulating knob which is rotatably and pivotally supported on the support member and is protruded into a space defined between the spokes and the ring, a hollow which is formed on one of the support member and the manipulating knob, a stopper protrusion which is formed on the other of the support member and the manipulating knob and is protruded into an inside of the hollow, and an output changeover mechanism which is configured to output two different kinds of electric signals in response to a rotating direction of the manipulating knob, wherein by rotatably operating the manipulating knob in directions opposite to each other with respect to a rotationally neutral position, the output changeover mechanism selectively outputs one of the electric signals, and wherein the stopper protrusion is brought into contact with an inner wall of the hollow such that a rotational range of the manipulating knob is restricted.

11. A vehicle-mounting steering switch according to claim 10, wherein the stopper protrusion is mounted on the support member, and wherein the hollow is formed in the manipulating knob.

12. A vehicle-mounting steering switch according to claim 11, wherein a thickness of the inner wall of the hollow at a position with which the stopper protrusion is brought into contact is increased compared to a periphery thereof.

13. A vehicle-mounting steering switch according to claim 12, wherein the stopper protrusion has a tapered shape narrowed toward a distal end thereof.

14. A vehicle-mounting steering switch according to claim 11, wherein the stopper protrusion has a tapered shape narrowed toward a distal end thereof.

15. A vehicle-mounting steering switch according to claim 10, wherein the stopper protrusion has a tapered shape narrowed toward a distal end thereof.

* * * * *